United States Patent
Tanaka (10) Patent No.: US 11,159,198 B2
(45) Date of Patent: Oct. 26, 2021

(54) RADIO COMMUNICATION APPARATUS, RADIO COMMUNICATION SYSTEM, RADIO COMMUNICATION METHOD, AND PROGRAM

(71) Applicant: NEC Corporation, Tokyo (JP)

(72) Inventor: Tomozou Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/899,418

(22) Filed: Jun. 11, 2020

(65) Prior Publication Data
US 2020/0395976 A1    Dec. 17, 2020

(30) Foreign Application Priority Data
Jun. 12, 2019  (JP) .............................. JP2019-109502

(51) Int. Cl.
H04L 27/06   (2006.01)
H04B 1/7113  (2011.01)
H04B 1/712   (2011.01)
H04B 1/709   (2011.01)
H04B 1/7117  (2011.01)

(52) U.S. Cl.
CPC ........... *H04B 1/7113* (2013.01); *H04B 1/709* (2013.01); *H04B 1/712* (2013.01); *H04B 1/7117* (2013.01)

(58) Field of Classification Search
CPC .... H04B 1/7113; H04B 1/709; H04B 1/7117; H04B 1/712
USPC .................................................. 375/354, 343
See application file for complete search history.

(56) References Cited

U.S. PATENT DOCUMENTS

| 6,741,667 B1* | 5/2004 | Suda ................. H04B 1/70754 370/335 |
| 2001/0050950 A1* | 12/2001 | Sato ..................... H04B 1/7113 375/150 |
| 2010/0208603 A1* | 8/2010 | Ishii ..................... H04B 1/7113 370/252 |

(Continued)

FOREIGN PATENT DOCUMENTS

JP       2005-268849 A    9/2005

OTHER PUBLICATIONS

3GPP TS 38.211 V15.0.0 (Dec. 2017).

*Primary Examiner* — Tesfaldet Bocure
(74) *Attorney, Agent, or Firm* — Sughrue Mion, PLLC (57) ABSTRACT

The present disclosure provides a radio communication apparatus, a radio communication system, a radio communication method, and a program capable of demodulating signals at appropriate reception timings. A radio communication apparatus 11 includes: a measurement unit 111 configured to measure delay profiles of a plurality of frequency bands; and a determination unit 112 configured to determine a path timing of a first frequency band $f_1$ based on a time difference between a first time $t_{m1}$ indicating a time of a maximum amplitude in the first frequency band $f_1$ of the plurality of frequency bands and a second time $t_{m2}$ indicating a time of a maximum amplitude in a second frequency band $f_2$ of the plurality of frequency bands.

5 Claims, 9 Drawing Sheets

(56) References Cited

U.S. PATENT DOCUMENTS

2010/0238906 A1\* 9/2010 Komatsu .............. H04B 7/2681
370/336
2011/0249703 A1\* 10/2011 Najar Marton ...... H04B 1/7183
375/138

\* cited by examiner

RADIO COMMUNICATION APPARATUS, RADIO COMMUNICATION SYSTEM, RADIO COMMUNICATION METHOD, AND PROGRAM

INCORPORATION BY REFERENCE

This application is based upon and claims the benefit of priority from Japanese patent application No. 2019-109502, filed on Jun. 12, 2019, the disclosure of which is incorporated herein in its entirety by reference.

TECHNICAL FIELD

The present disclosure relates to a radio communication apparatus, a radio communication system, a radio communication method, and a program, and more particularly, to a radio communication apparatus, a radio communication system, a radio communication method, and a program capable of demodulating signals at appropriate reception timings.

BACKGROUND ART

There are radio communication systems in which a plurality of base stations and a plurality of mobile terminals perform communication. In these radio communication systems, as disclosed in 3GPP TS 38.211 v.15.0.0, the communication between the base stations and the mobile terminals is performed on a basis of radio frames or on a basis of subframes. A receiver that receives data in a base station or a mobile terminal receives data at a plurality of reception timings due to an influence of a timing error of data transmission and a multi-path propagation delay. When the receiver receives data based on the timing of a path in which the delay is large, data between subframes adjacent to each other overlap each other. As a result, inter-symbol interference (ISI) occurs and the communication quality of data is degraded.

Japanese Unexamined Patent Application Publication No. 2005-268849 discloses a digital signal processing unit including an RF reception signal processing unit, an ACG controller that controls an AGC amplification unit, a search finger processing unit, a tracking finger processing unit, a path search and path selection unit, and a threshold and correction level generator. Further, Japanese Unexamined Patent Application Publication No. 2005-268849 discloses that the path search and path selection unit dynamically performs path search for each branch in collaboration with the search finger processing unit and corrects the reception signal level using a correction signal from the threshold and correction level generator, and performs path selection for Rake synthesis based on the results of this correction. Japanese Unexamined Patent Application Publication No. 2005-268849 does not disclose, however, detecting the optimal reception timing and correcting the reception timing in order to reduce inter-symbol interference.

SUMMARY

As described above, there is a problem that, when the receiver receives data, inter-symbol interference occurs and the communication quality is degraded.

An example object of the present disclosure is to provide a radio communication apparatus, a radio communication system, a radio communication method, and a program that solve the aforementioned problems.

A radio communication apparatus according to the present disclosure includes:
a measurement unit configured to measure delay profiles of a plurality of frequency bands; and
a determination unit configured to determine a path timing of a first frequency band based on a time difference between a first time indicating a time of a maximum amplitude in the first frequency band of the plurality of frequency bands and a second time indicating a time of a maximum amplitude in a second frequency band of the plurality of frequency bands.

A radio communication system according to the present disclosure includes:
one radio communication apparatus and another radio communication apparatus that communicates with the one radio communication apparatus, in which
the other radio communication apparatus includes a transmission unit configured to transmit signals of a plurality of frequency bands, and
the radio communication apparatus includes:
a measurement unit configured to measure delay profiles of the plurality of frequency bands; and
a determination unit configured to determine a path timing of a first frequency band based on a time difference between a first time indicating a time of a maximum amplitude in the first frequency band of the plurality of frequency bands and a second time indicating a time of a maximum amplitude in a second frequency band of the plurality of frequency bands.

A radio communication method according to the present disclosure includes:
measuring delay profiles of a plurality of frequency bands; and
determining a path timing of a first frequency band based on a time difference between a first time indicating a time of a maximum amplitude in the first frequency band of the plurality of frequency bands and a second time indicating a time of a maximum amplitude in a second frequency band of the plurality of frequency bands.

A program according to the present disclosure causes a computer to execute the following processing of:
measuring delay profiles of a plurality of frequency bands; and
determining a path timing of a first frequency band based on a time difference between a first time indicating a time of a maximum amplitude in the first frequency band of the plurality of frequency bands and a second time indicating a time of a maximum amplitude in a second frequency band of the plurality of frequency bands.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EMBODIMENTS

Hereinafter, with reference to the drawings, an example embodiment of the present disclosure will be explained. Throughout the drawings, the same or corresponding elements are denoted by the same reference symbols and overlapping descriptions will be omitted for the sake of simplification of the description.

Example Embodiment

The outline of configurations of a radio communication apparatus and a radio communication system according to an example embodiment will be explained.

Figure 1:
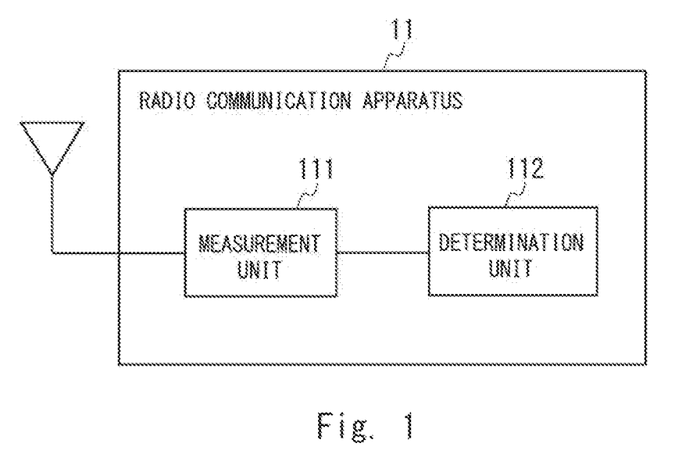
FIG. 1 is a block diagram illustrating a radio communication apparatus according to an example embodiment.

FIG. 1 is a block diagram illustrating the radio communication apparatus according to the example embodiment.

Figure 2:
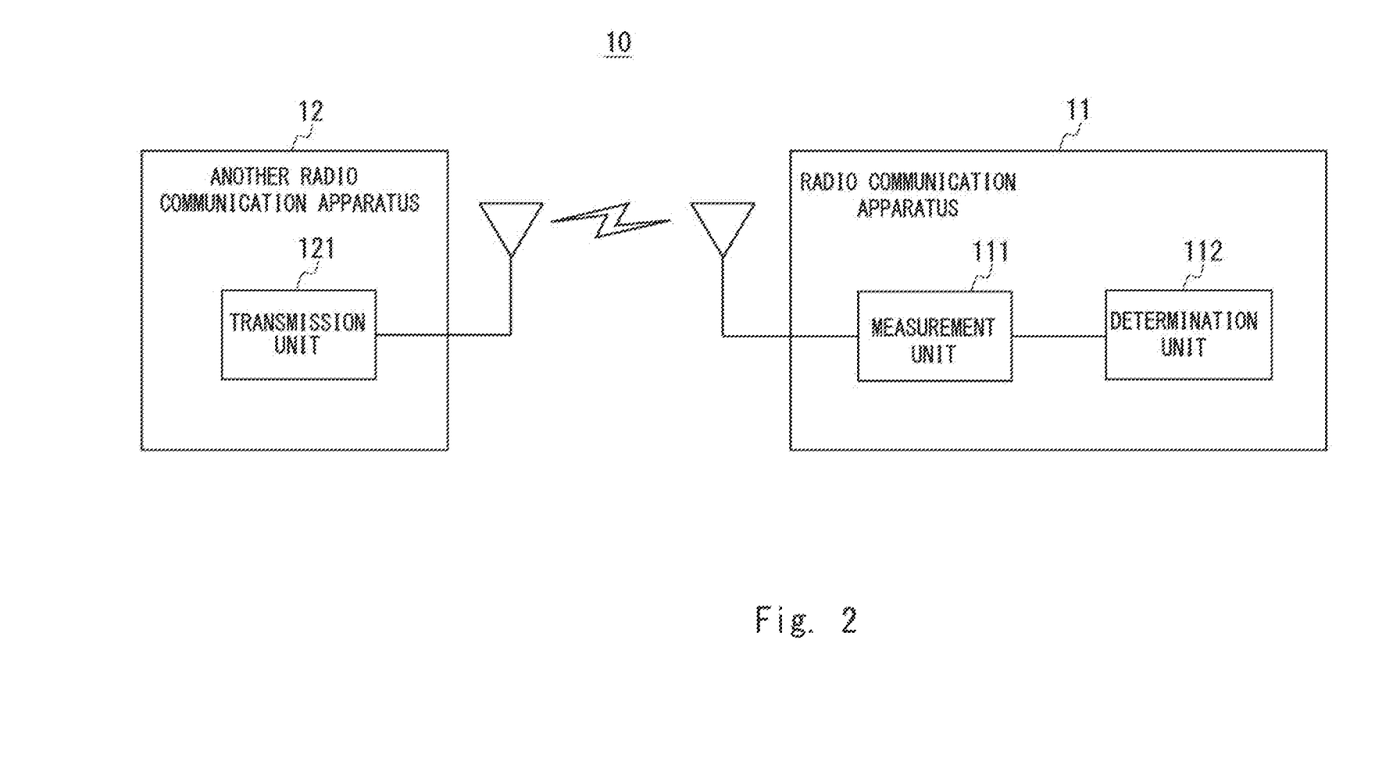
FIG. 2 is a block diagram illustrating a radio communication system according to the example embodiment.

FIG. 2 is a block diagram illustrating the radio communication system according to the example embodiment.

Figure 3:
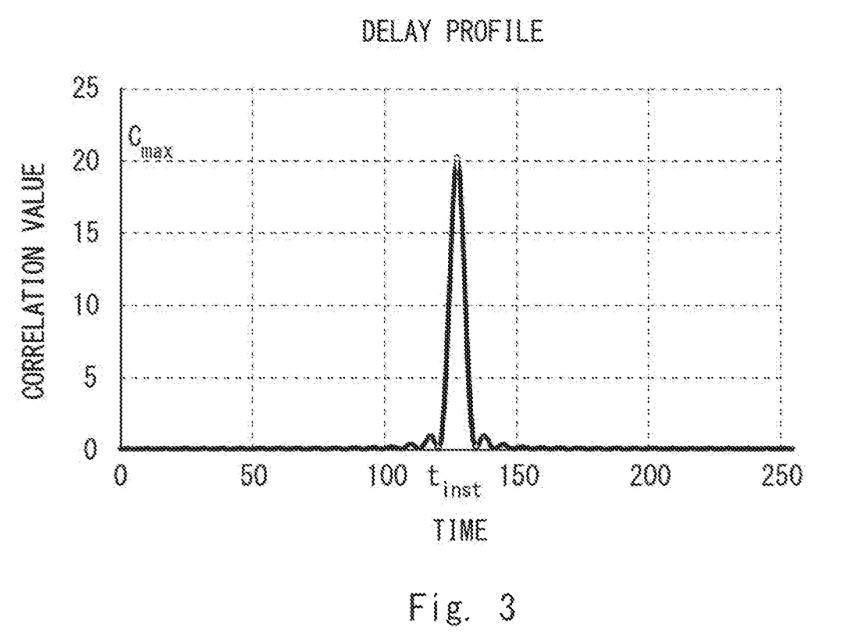
FIG. 3 is a graph illustrating a delay profile.

FIG. 3 is a graph illustrating a delay profile.

The horizontal axis of FIG. 3 indicates time and the vertical axis thereof indicates a correlation value.

As shown in FIG. 1, a radio communication apparatus 11 according to the example embodiment includes a measurement unit 111 and a determination unit 112.

As shown in FIG. 2, a radio communication system 10 according to the example embodiment includes a radio communication apparatus 11, and another radio communication apparatus 12 that communicates with the radio communication apparatus 11. In a downlink communication, for example, the other radio communication apparatus 12 is a base station and the radio communication apparatus 11 is a mobile terminal. In an uplink communication, the other radio communication apparatus 12 is a mobile terminal and the radio communication apparatus 11 is a base station.

The other radio communication apparatus 12 includes a transmission unit 121 that transmits signals of a plurality of frequency bands.

The measurement unit 111 of the radio communication apparatus 11 measures delay profiles of a plurality of frequency bands. FIG. 3 is a graph showing a delay profile of one frequency band for the sake of simplification. The measurement unit 111 detects a maximum correlation value $c_{max}$ and a corresponding instantaneous path timing $t_{inst}$ as shown in FIG. 3. The maximum correlation value is referred to as a maximum correlation value amplitude or a maximum amplitude.

The determination unit 112 obtains the time difference between a first time $t_{m1}$ indicating the time of the maximum amplitude in a first frequency band $f_1$ of the plurality of frequency bands and a second time $t_{m2}$ indicating the time of the maximum amplitude in a second frequency band $f_2$ of the plurality of frequency bands. The determination unit 112 determines the path timing of the first frequency band $f_1$ based on the time difference.

The radio communication apparatus 11 demodulates the signal of the first frequency band $f_1$ based on the path timing that has been determined.

The first frequency band $f_1$ may be a frequency band higher than the second frequency band $f_2$. Alternatively, the first frequency band $f_1$ may be a frequency band that is equal to or smaller than the second frequency band $f_2$.

Further, the first frequency band $f_1$ may be a frequency before hopping in a frequency hopping system and the second frequency band $f_2$ may be a frequency after hopping in the frequency hopping system.

Further, the first frequency band $f_1$ may be a frequency before Bandwidth Part (BWP) switching in BWP switching and the second frequency band $f_2$ may be a frequency after BWP switching in the BWP switching.

Further, a cyclic prefix (CP) (guard interval) may be set based on the path timing.

Further, signals may be referred to as data. Further, the path timing may be referred to as a reception timing or a demodulation timing.

Now, the reception timing when the typical radio communication apparatus receives signals will be described.

Figure 4A:
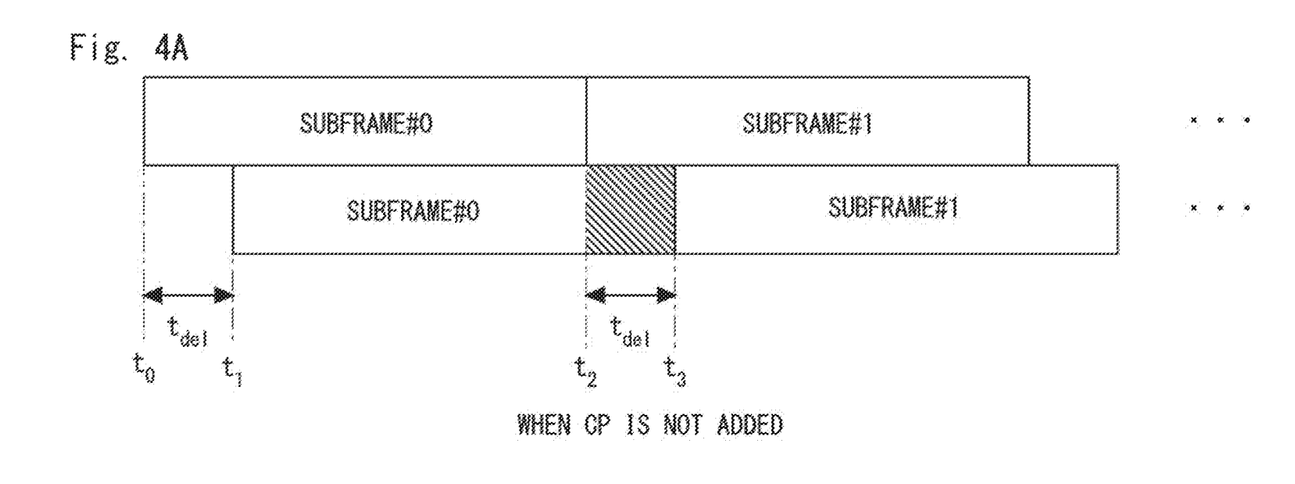
FIG. 4A is a diagram illustrating timings of receiving subframes.

FIG. 4A is a diagram illustrating timings of receiving subframes.

Figure 4B:
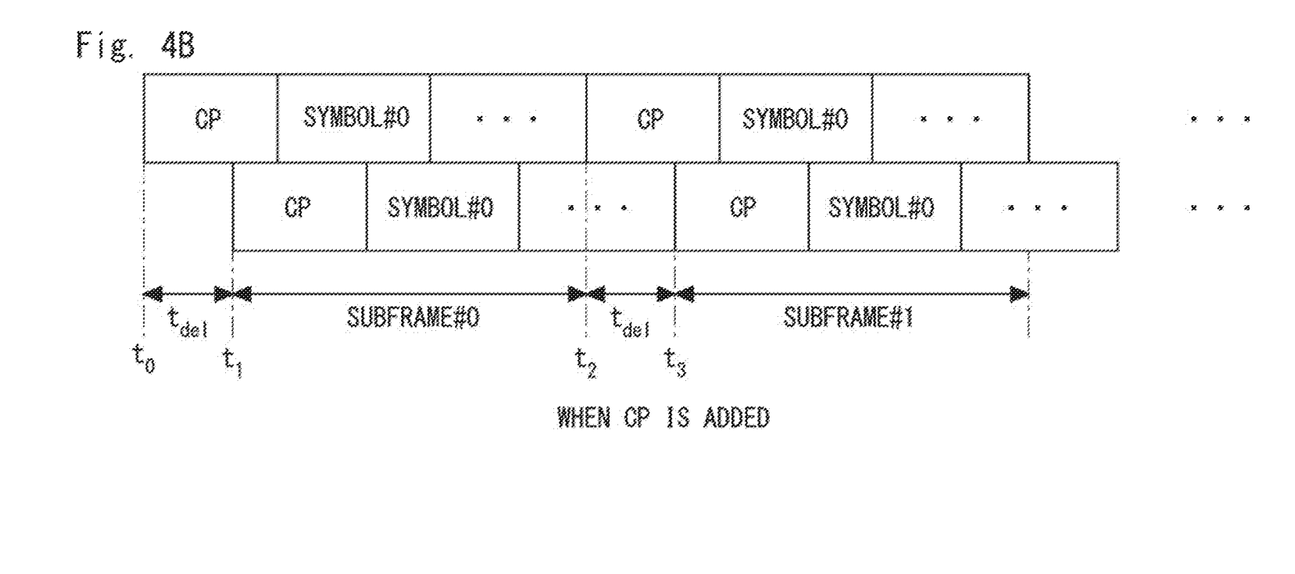
FIG. 4B is a diagram illustrating timings of receiving subframes.

FIG. 4B is a diagram illustrating timings of receiving subframes.

Figure 5:
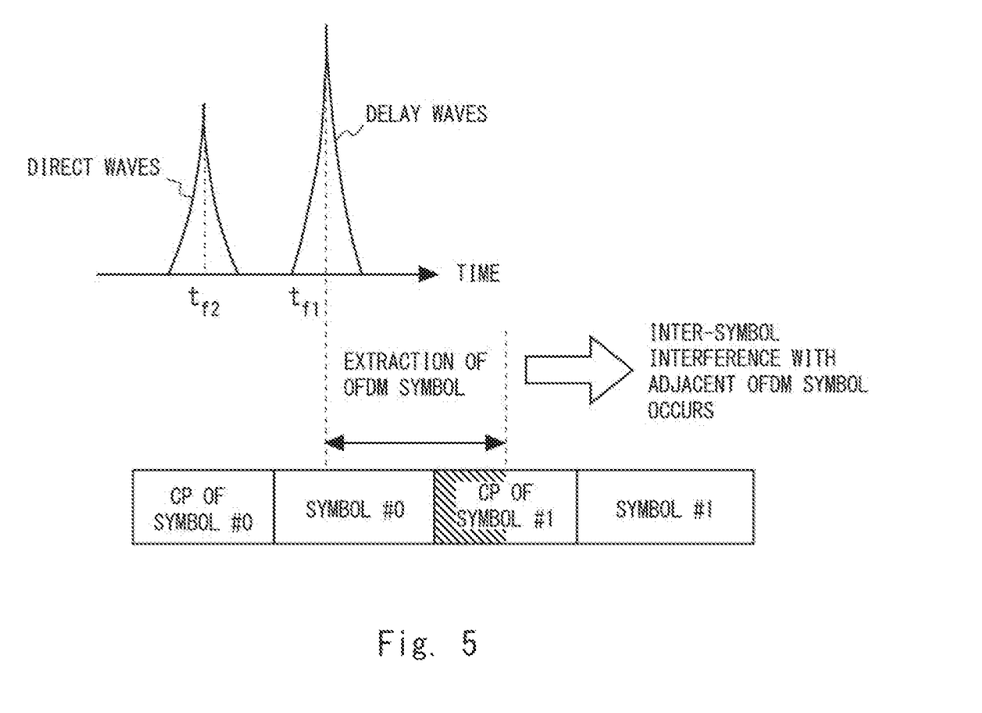
FIG. 5 is a diagram illustrating a position at which a symbol is extracted in a subframe.

FIG. 5 is a diagram illustrating a position at which a symbol is extracted in a subframe.

The horizontal axis shown in FIG. 5 indicates time.

Figure 6:
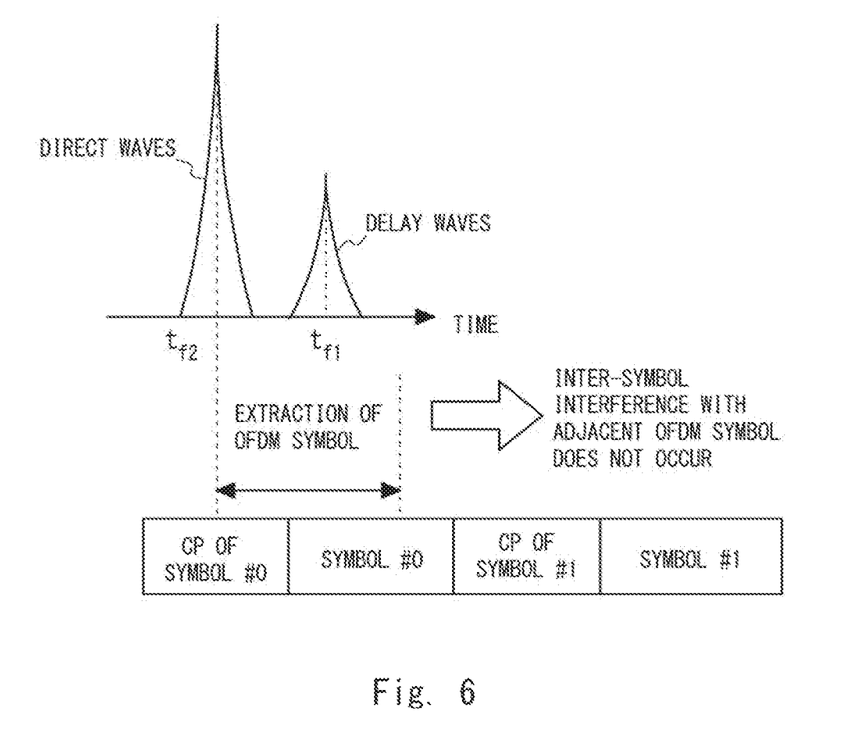
FIG. 6 is a diagram illustrating a position at which a symbol is extracted in a subframe.

FIG. 6 is a diagram illustrating a position at which a symbol is extracted in a subframe.

The horizontal axis shown in FIG. 6 indicates time.

As shown in FIG. 4A and FIG. 4B, the radio communication apparatus extracts data corresponding to one subframe, with a reception timing $t_0$ or a reception timing $t_1$ (it may be a reception timing $t_2$ or a reception timing $t_3$) at the top, and performs reception processing. Accordingly, in the radio communication apparatus, data between subframes adjacent to each other overlap each other (see FIG. 4A). Then inter-subframe interference, that is, inter-symbol interference, which is due to the overlap of the data, occurs, which causes the communication quality to be degraded. In order to overcome the inter-symbol interference, a cyclic prefix is added to the top of an Orthogonal Frequency Division Multiplexing (OFDM) symbol in the subframe (see FIG. 4B).

However, when a path timing $t_{f1}$ of the first frequency band $f_1$ is late due to the state of the radio propagation path, as shown in FIG. 5, time at which the OFDM symbol is extracted is delayed. Therefore, inter-symbol interference occurs between this OFDM symbol and the adjacent OFDM symbol. Therefore, in order to reduce inter-symbol interference with the adjacent OFDM symbol, it is required to correct (update) the path timing $t_{f1}$ of the first frequency band $f_1$ and optimize this path timing.

In order to solve the aforementioned problems, as shown in FIG. 6, the radio communication apparatus 11 according to the example embodiment determines, when the path timing $t_{f1}$ of the first frequency band $f_1$ is so late that inter-symbol interference occurs, a path timing $t_{f2}$ of the second frequency band $f_2$ to be the path timing of the first frequency band $f_1$ to demodulate the signal.

Specifically, when the path timing $t_{f1}$ of the first frequency band $f_1$ is later than the path timing $t_{f2}$ of the second frequency band $f_2$ and the time difference between the path timing $t_{f1}$ and the path timing $t_{f2}$ is larger than a path update threshold $thr_{udt}$, the radio communication apparatus 11 determines the path timing $t_{f2}$ to be the path timing of the first frequency band $f_1$. That is, the radio communication apparatus 11 demodulates the signal using the path timing $t_{f2}$ of the second frequency band $f_2$ in place of the path timing $t_{f1}$ of the first frequency band $f_1$.

Further, when the path timing $t_{f1}$ of the first frequency band $f_1$ is later than the path timing $t_{f2}$ of the second frequency band $f_2$ and the time difference between the path timing $t_{f1}$ and the path timing $t_{f2}$ is equal to or smaller than the path update threshold $thr_{udt}$, the radio communication apparatus 11 determines the path timing $t_{f1}$ to be the path timing of the first frequency band $f_1$.

Accordingly, the inter-symbol interference is reduced, whereby it is possible to prevent the communication quality from being degraded. As a result, it is possible to provide the radio communication apparatus, the radio communication system, the radio communication method, and the program capable of demodulating signals at appropriate reception timings.

Note that the path timing $t_{f1}$ of the first frequency band $f_1$ may be referred to a first time $t_{m1}$ and the path timing $t_{f2}$ of the second frequency band $f_2$ may be referred to as a second time $t_{m2}$.

The details of the configuration of the radio communication apparatus according to the example embodiment will be described.

In the following description, for example, a source BS is used as the other radio communication apparatus 12 and a Target User Equipment (target UE) is used as the radio communication apparatus 11, or a source UE is used as the other radio communication apparatus 12 and a target BS is used as the radio communication apparatus 11. The other radio communication apparatus 12 is collectively referred to as a source BS/UE (Source BS/UE) and the radio communication apparatus 11 is collectively referred to as a target UE/BS (Target UE/BS). In the following description, an explanation will be given based on the assumption that the target UE/BS corresponds to the UE/base station that detects the path timing. Note that BS may be referred to as a base station.

While the radio communication system 10 includes one source BS/UE and one target UE/BS in this example embodiment, this is merely one example. The radio communication system 10 may include one or more source BS/UE, and one or more target UE/BS.

Figure 7:
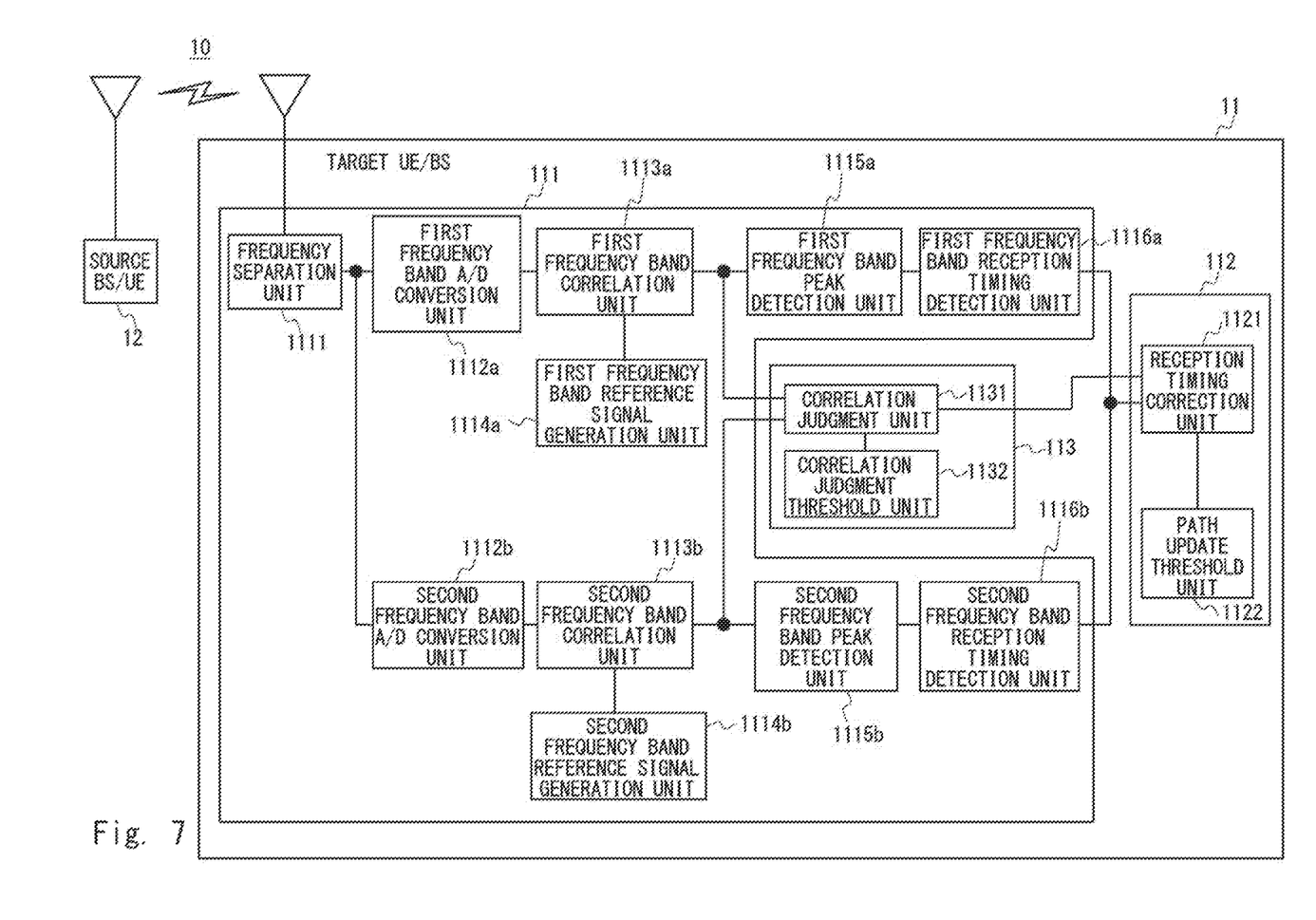
FIG. 7 is a block diagram illustrating a radio communication system according to an example embodiment.

FIG. 7 is a block diagram illustrating the radio communication system according to the example embodiment.

As shown in FIG. 7, the source BS/UE (the other radio communication apparatus 12) transmits a reference signal (RS) used to detect the path timing to the target UE/BS (the radio communication apparatus 11).

The target UE/BS (radio communication apparatus 11) further includes a judgment unit 113. The measurement unit 111 of the target UE/BS includes a frequency separation unit 1111 and a first frequency band Analog/Digital (A/D) conversion unit 1112a. The measurement unit 111 further includes a first frequency band correlation unit 1113a, a first frequency band reference signal generation unit 1114a, a first frequency band peak detection unit 1115a, and a first frequency band reception timing detection unit 1116a. The measurement unit 111 further includes a second frequency band A/D conversion unit 1112b, a second frequency band correlation unit 1113b, a second frequency band reference signal generation unit 1114b, a second frequency band peak detection unit 1115b, and a second frequency band reception timing detection unit 1116b.

The determination unit 112 includes a reception timing correction unit 1121 and a path update threshold unit 1122.

The judgment unit 113 includes a correlation judgment unit 1131 and a correlation judgment threshold unit 1132. The judgment unit 113 judges similarities between the path timing $t_{f1}$ of the first frequency band $f_1$ and the path timing $t_{f2}$ of the second frequency band $f_2$.

The frequency separation unit 1111 receives the reference signal transmitted from the source BS/UE. The reference signal is affected by a radio propagation path or noise. Therefore, the frequency separation unit 1111 receives the reference signal as a reception reference signal.

The frequency separation unit 1111 separates the reference signal (it is referred to as a reception reference signal) received from the source BS/UE into a reception reference signal of the first frequency band $f_1$ and a reception reference signal of the second frequency band $f_2$. The reception reference signal of the first frequency band $f_1$ is output to the first frequency band A/D conversion unit 1112a and the reception reference signal of the second frequency band $f_2$ is output to the second frequency band A/D conversion unit 1112b.

Now, a flow of the reception reference signal of the first frequency band $f_1$ will be described.

The reception reference signal of the first frequency band $f_1$ is input to the first frequency band A/D conversion unit 1112a from the frequency separation unit 1111.

The first frequency band A/D conversion unit 1112a A/D converts the input reception reference signal of the first frequency band $f_1$ and generates a digital reception reference signal of the first frequency band $f_1$. The first frequency band A/D conversion unit 1112a outputs the generated digital reception reference signal of the first frequency band $f_1$ to the first frequency band correlation unit 1113a.

The first frequency band reference signal generation unit 1114a generates the reference signal of the first frequency band $f_1$ based on information regarding the reference signal of the first frequency band $f_1$ regarding which a notification has been sent in advance. Since the information regarding the reference signal is sent from the source BS/UE to the target UE/BS in advance, the target UE/BS is able to grasp the signal pattern of the reference signal in advance. The first frequency band reference signal generation unit 1114a outputs the reference signal of the first frequency band $f_1$ that has been generated to the first frequency band correlation unit 1113a.

The first frequency band correlation unit 1113a receives the digital reception reference signal of the first frequency band $f_1$ from the first frequency band A/D conversion unit 1112a. Further, the first frequency band correlation unit 1113a receives the reference signal of the first frequency band $f_1$ from the first frequency band reference signal generation unit 1114a. The first frequency band correlation unit 1113a calculates a correlation value $c_{f1}$ (*complex number) of the first frequency band $f_1$ using the digital reception reference signal of the first frequency band $f_1$ and the reference signal of the first frequency band $f_1$. The first frequency band correlation unit 1113a outputs the calculated correlation value $c_{f1}$ of the first frequency band $f_1$ to the first frequency band peak detection unit 1115a and the correlation judgment unit 1131.

The first frequency band peak detection unit 1115a receives the correlation value $c_{f1}$ of the first frequency band $f_1$ from the first frequency band correlation unit 1113a. The first frequency band peak detection unit 1115a detects an instantaneous path timing $t_{inst\_f1}$ that corresponds to an instantaneous maximum correlation value $c_{inst\_f1}$ of the first frequency band $f_1$ from the amplitude value of the input correlation value $c_{f1}$ of the first frequency band $f_1$. The first frequency band peak detection unit 1115a outputs the instantaneous maximum correlation value $c_{inst\_f1}$ of the first frequency band $f_1$ and the instantaneous path timing $t_{inst\_f1}$ that have been detected to the first frequency band reception timing detection unit 1116a.

The first frequency band reception timing detection unit 1116a receives the instantaneous maximum correlation value $c_{inst\_f1}$ of the first frequency band $f_1$ and the instantaneous path timing $t_{inst\_f1}$ from the first frequency band peak detection unit 1115a. The first frequency band reception timing detection unit 1116a stores the instantaneous maximum correlation value $c_{inst\_f1}$ of the first frequency band $f_1$ and the instantaneous path timing $t_{inst\_f1}$ that have been input thereto in a memory (not shown).

The first frequency band reception timing detection unit 1116a weights the past and latest instantaneous maximum correlation value $c_{inst\_f1}$ of the first frequency band $f_1$ and instantaneous path timing $t_{inst\_f1}$ stored in the memory, thereby generating the path timing $t_{f1}$ of the first frequency band $f_1$. The first frequency band reception timing detection unit 1116a outputs the generated path timing $t_{f1}$ of the first frequency band $f_1$ to the reception timing correction unit 1121.

Hereinafter, a flow of the reception reference signal of the second frequency band $f_2$ will be described.

The reception reference signal of the second frequency band $f_2$ is input to the second frequency band A/D conversion unit 1112b from the frequency separation unit 1111.

The second frequency band A/D conversion unit 1112b A/D converts the input reception reference signal of the second frequency band $f_2$ and generates the digital reception reference signal of the second frequency band $f_2$. The second frequency band A/D conversion unit 1112b outputs the generated digital reception reference signal of the second frequency band $f_2$ to the second frequency band correlation unit 1113b.

The second frequency band reference signal generation unit 1114b generates the reference signal of the second frequency band $f_2$ based on information regarding the reference signal of the second frequency band $f_2$ regarding which a notification has been sent in advance. The second frequency band reference signal generation unit 1114b outputs the generated reference signal of the second frequency band $f_2$ to the second frequency band correlation unit 1113b.

The second frequency band correlation unit 1113b receives the digital reception reference signal of the second frequency band $f_2$ from the second frequency band A/D conversion unit 1112b. Further, the second frequency band correlation unit 1113b receives the reference signal of the second frequency band $f_2$ from the second frequency band reference signal generation unit 1114b. The second frequency band correlation unit 1113b calculates a correlation value $c_{f2}$ (*complex number) of the second frequency band $f_2$ using the digital reception reference signal of the second frequency band $f_2$ and the reference signal of the second frequency band $f_2$. The second frequency band correlation unit 1113b outputs the calculated correlation value $c_{f2}$ of the second frequency band $f_2$ to the second frequency band peak detection unit 1115b and the correlation judgment unit 1131.

The second frequency band peak detection unit 1115b receives the correlation value $c_{f2}$ of the second frequency band $f_2$ from the second frequency band correlation unit 1113b. The second frequency band peak detection unit 1115b detects an instantaneous maximum correlation value $c_{inst\_f2}$ of the second frequency band $f_2$ and a corresponding instantaneous path timing $t_{inst\_f2}$ from the amplitude value of the input correlation value $c_{f2}$ of the second frequency band $f_2$. The second frequency band peak detection unit 1115b outputs the instantaneous maximum correlation value $c_{inst\_f2}$ of the second frequency band $f_2$ and the instantaneous path timing $t_{inst\_f2}$ that have been detected to the second frequency band reception timing detection unit 1116b.

The second frequency band reception timing detection unit 1116b receives the instantaneous maximum correlation value $c_{inst\_f2}$ of the second frequency band $f_2$ and the instantaneous path timing $t_{inst\_f2}$ from the second frequency band peak detection unit 1115b. The second frequency band reception timing detection unit 1116b stores the instantaneous maximum correlation value $c_{inst\_f2}$ of the second frequency band $f_2$ and the instantaneous path timing $t_{inst\_f2}$ that have been input thereto in a memory (not shown).

The second frequency band reception timing detection unit 1116b weights the past and latest instantaneous maximum correlation value $c_{inst\_f2}$ of the second frequency band $f_2$ and instantaneous path timing $t_{inst\_f2}$ stored in the memory, thereby generating the path timing $t_{f2}$ of the second frequency band $f_2$. The second frequency band reception timing detection unit 1116b outputs the generated path timing $t_{f2}$ of the second frequency band $f_2$ to the reception timing correction unit 1121.

Hereinafter, judgment of similarities between the path timing of the first frequency band $f_1$ and that of the second frequency band $f_2$ will be described.

The correlation judgment threshold unit 1132 sets a correlation judgment threshold $thr_{f1\_f2}$ that is used to judge the similarities between the path timing of the first frequency band $f_1$ and that of the second frequency band $f_2$. The correlation judgment threshold unit 1132 outputs the set correlation judgment threshold $thr_{f1\_f2}$ to the correlation judgment unit 1131.

The correlation judgment unit 1131 receives the correlation value $c_{f1}$ of the first frequency band $f_1$ from the first frequency band correlation unit 1113a. Further, the correlation judgment unit 1131 receives the correlation value $c_{f2}$ of the second frequency band $f_2$ from the second frequency band correlation unit 1113b. Further, the correlation judgment unit 1131 receives the correlation judgment threshold $thr_{f1\_f2}$ from the correlation judgment threshold unit 1132.

The correlation judgment unit 1131 calculates a correlation judgment value $c_{f1\_f2}$ between the first frequency band $f_1$ and the second frequency band $f_2$ based on the following expressions.

$$c_{f1\_f2} = \frac{1}{N_{corr}} \sum_{i=0}^{N_{corr}-1} \left| \frac{|c_{f1}(i)|}{c_{inst,f1}} - \frac{|c_{f2}(i)|}{c_{inst,f2}} \right|$$

$$c_{inst,f1} = \max_{0 \le i < N_{corr}} |c_{f1}(i)|$$

$$c_{inst,f2} = \max_{0 \le i < N_{corr}} |c_{f2}(i)|$$

Now, the number of samples $N_{corr}$ indicates the number of samples of the correlation value $c_{f1}$ or the number of samples of the correlation value $c_{f2}$. The instantaneous maximum correlation value $c_{inst\_f1}$ indicates the maximum amplitude value of the correlation value $c_{f1}$ of the first frequency band $f_1$. The instantaneous maximum correlation value $c_{inst\_f2}$ indicates the maximum amplitude value of the correlation value $c_{f2}$ of the second frequency band $f_2$. The symbol i indicates the sample number of the correlation value $c_{f1}$ and the sample number of the correlation value $c_{f2}$.

The correlation judgment unit 1131 judges the similarities based on the correlation judgment value $c_{f1\_f2}$, which is the difference between the correlation value $c_{f1}$ of the first frequency band $f_1$ and the correlation value $c_{f2}$ of the second frequency band $f_2$.

Specifically, the correlation judgment unit 1131 compares the correlation judgment value $c_{f1\_f2}$ with the correlation judgment threshold $thr_{f1\_f2}$. The correlation judgment unit 1131 judges, from the results of the comparison, similarities between the correlation value $c_{f1}$ of the first frequency band $f_1$ and the correlation value $c_{f2}$ of the second frequency band $f_2$, i.e., the similarities between the path timing of the first frequency band $f_1$ and the path timing of the second frequency band $f_2$.

Specifically, when the calculated correlation judgment value $c_{f1\_f2}$ is equal to or smaller than the correlation judgment threshold $thr_{f1\_f2}$, the correlation judgment unit 1131 judges that the path timing of the first frequency band $f_1$ is similar to the path timing of the second frequency band $f_2$ (there are similarities).

On the other hand, when the calculated correlation judgment value $c_{f1\_f2}$ is larger than the correlation judgment threshold $thr_{f1\_f2}$, the correlation judgment unit 1131 judges that the path timing of the first frequency band $f_1$ is not similar to the path timing of the second frequency band $f_2$ (there are no similarities). The correlation judgment unit 1131 notifies the reception timing correction unit 1121 of the results of the judgment.

The path update threshold unit 1122 sets the path update threshold $thr_{udt}$ for updating the path timing $t_{f1}$ of the first frequency band $f_1$. The path update threshold unit 1122 outputs the set path update threshold $thr_{udt}$ to the reception timing correction unit 1121.

The reception timing correction unit 1121 receives the path timing $t_{f1}$ of the first frequency band $f_1$ from the first frequency band reception timing detection unit 1116a. The reception timing correction unit 1121 receives the path timing $t_{f2}$ of the second frequency band $f_2$ from the second frequency band reception timing detection unit 1116b. The reception timing correction unit 1121 receives the path update threshold $thr_{udt}$ from the path update threshold unit 1122. The reception timing correction unit 1121 receives a notification indicating the results of the judgment regarding the similarities between the path timing of the first frequency band $f_1$ and the path timing of the second frequency band $f_2$ from the correlation judgment unit 1131.

In the following description, as shown in FIG. 5, a case in which the target UE/BS (radio communication apparatus 11) has detected a path in which the path timing $t_{f1}$ of the first frequency band $f_1$ is reflective waves or delay waves (NLoS: Non-Line of Sight), not a path in which the above path timing $t_{f1}$ of the first frequency band $f_1$ is direct waves (LoS: Line of Sight) will be discussed. In this case, inter-symbol interference, which is due to demodulation of adjacent OFDM symbols, occurs.

Therefore, the target UE/BS determines the path timing of the first frequency band $f_1$ based on the time difference between the path timing $t_{f1}$ of the first frequency band $f_1$ and the path timing $t_{f2}$ of the second frequency band $f_2$ and the results of the similarities.

Specifically, when the path timing $t_{f1}$ of the first frequency band $f_1$ is later than the path timing $t_{f2}$ of the second frequency band $f_2$, this time difference is larger than the path update threshold $thr_{udt}$, and it has been judged that there are similarities between the path timing $t_{f1}$ of the first frequency band $f_1$ and the path timing $t_{f2}$ of the second frequency band $f_2$, the target UE/BS determines the path timing $t_{f2}$ of the second frequency band $f_2$ to be the path timing of the first frequency band $f_1$.

More specifically, when the value (time difference) obtained by subtracting the path timing $t_{f2}$ of the second frequency band $f_2$ from the path timing $t_{f1}$ of the first frequency band $f_1$ is larger than the path update threshold $thr_{udt}$ and it has been notified that there are similarities between the path timing of the first frequency band $f_1$ and the path timing of the second frequency band $f_2$, the target UE/BS sets the path timing $t_{f2}$ of the second frequency band $f_2$ to be the path timing of the first frequency band $f_1$.

On the other hand, when the value obtained by subtracting the path timing $t_{f2}$ of the second frequency band $f_2$ from the path timing $t_{f1}$ of the first frequency band $f_1$ is equal to or smaller than the path update threshold $thr_{udt}$, the target UE/BS does not update the path timing of the first frequency band $f_1$.

Further, when it is difficult to generate the path timing $t_{f1}$ of the first frequency band $f_1$, the target UE/BS sets the path timing $t_{f2}$ of the second frequency band $f_2$ to be the path timing $t_{f1}$ of the first frequency band $f_1$ for the purpose of performing processing of protecting the path timing.

That is, since the instantaneous maximum correlation value $c_{inst\_f1}$ indicating the maximum amplitude value of the correlation value $c_{f1}$ of the first frequency band $f_1$ is equal to or smaller than a predetermined amplitude value, when it is difficult to generate the path timing $t_{f1}$ of the first frequency band $f_1$, the target UE/BS determines the path timing $t$ of the second frequency band $f_2$ to be the path timing of the first frequency band $f_1$.

An operation of the radio communication apparatus according to the example embodiment will be explained.

In the following description, processing of the target UE/BS will be described taking a case in which one source BS/UE and one target UE/BS exist as an example.

Figure 8:
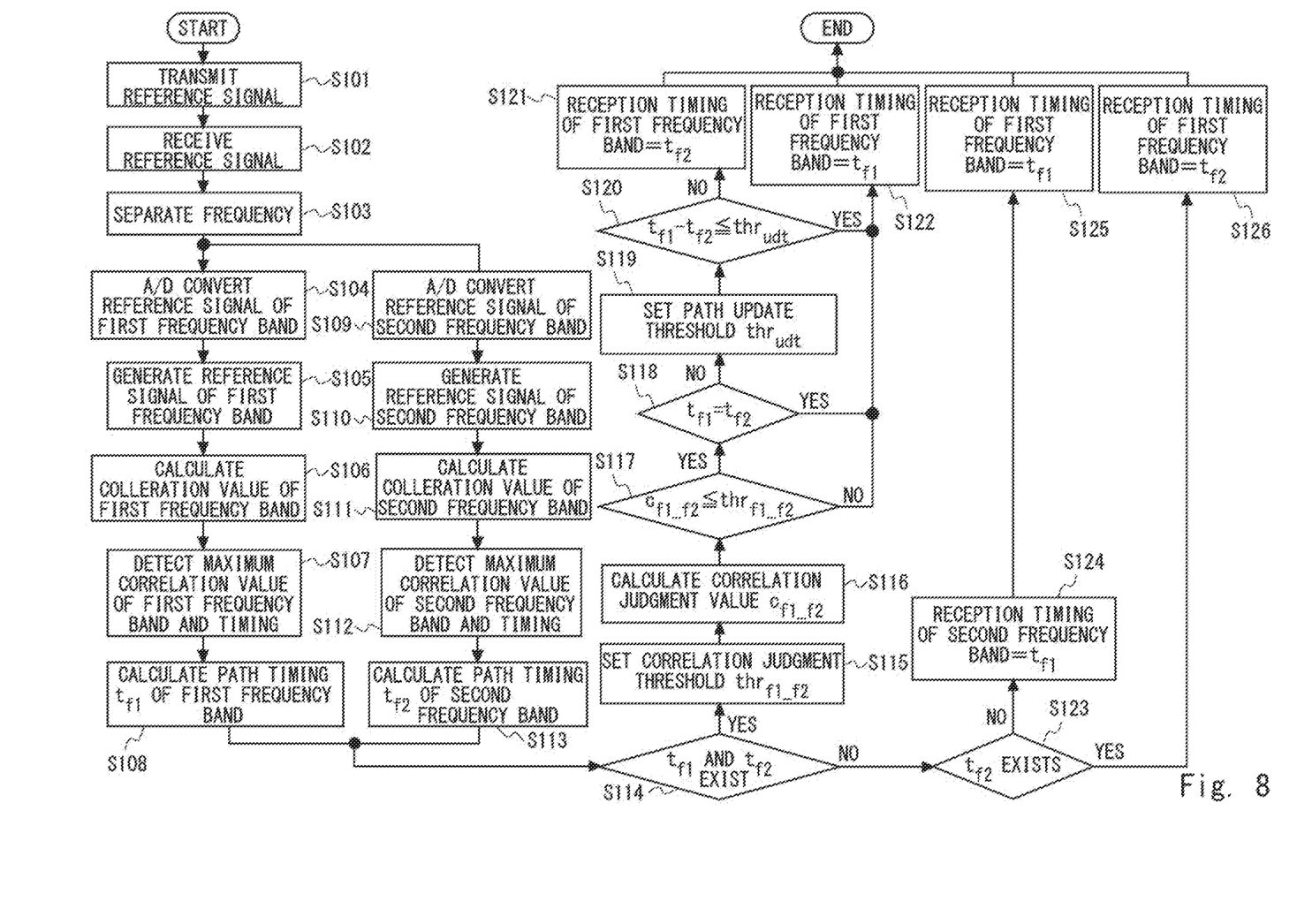
FIG. 8 is a flowchart illustrating an operation of the radio communication apparatus according to the example embodiment.

FIG. 8 is a flowchart illustrating an operation of the radio communication apparatus according to the example embodiment.

As shown in FIG. 8, the source BS/UE transmits the reference signal (Step S101).

The target UE/BS receives the reference signal (Step S102).

The frequency separation unit 1111 of the target UE/BS separates the received reference signal into the reception reference signal of the first frequency band $f_1$ and the reception reference signal of the second frequency band $f_2$ (Step S103).

The first frequency band A/D conversion unit 1112a A/D converts the reception reference signal of the first frequency band $f_1$ and generates the digital reception reference signal of the first frequency band $f_1$ (Step S104).

The first frequency band reference signal generation unit 1114a generates the reference signal of the first frequency band $f_1$ based on the information regarding the reference signal of the first frequency band $f_1$ regarding which a notification has been sent in advance (Step S105).

The first frequency band correlation unit 1113a calculates the correlation value $c_{f1}$ of the first frequency band $f_1$ using the digital reception reference signal of the first frequency band $f_1$ and the reference signal of the first frequency band $f_1$ (Step S106).

The first frequency band peak detection unit 1115a detects, from the correlation value $c_{f1}$ of the first frequency band $f_1$, the instantaneous maximum correlation value $c_{inst\_f1}$ of the first frequency band $f_1$ and the corresponding instantaneous path timing $t_{inst\_f1}$ (Step S107).

The first frequency band reception timing detection unit 1116a calculates the path timing $t_{f1}$ of the first frequency band $f_1$ using the past and latest instantaneous maximum correlation value $c_{inst\_f1}$ of the first frequency band $f_1$ and the corresponding instantaneous path timing $t_{inst\_f1}$ (Step S108).

The second frequency band A/D conversion unit 1112b A/D converts the reception reference signal of the second frequency band $f_2$ and generates the digital reception reference signal of the second frequency band $f_2$ (Step S109).

The second frequency band reference signal generation unit 1114b generates the reference signal of the second frequency band $f_2$ based on information regarding the reference signal of the second frequency band $f_2$ regarding which a notification has been sent in advance (Step S110).

The second frequency band correlation unit 1113b calculates the correlation value $c_{f2}$ of the second frequency band $f_2$ using the digital reception reference signal of the second frequency band $f_2$ and the reference signal of the second frequency band $f_2$ (Step S111).

The second frequency band peak detection unit 1115b detects, from the correlation value $c_{f2}$ of the second frequency band $f_2$, the instantaneous maximum correlation value $c_{inst\_f2}$ of the second frequency band $f_2$ and the corresponding instantaneous path timing $t_{inst\_f2}$ (Step S112).

The second frequency band reception timing detection unit 1116b calculates the path timing $t_{f2}$ of the second frequency band $f_2$ using the past and latest instantaneous maximum correlation value $c_{inst\_f2}$ of the second frequency band $f_2$ and the corresponding instantaneous path timing $t_{inst\_f2}$ (Step S113).

The correlation judgment unit 1131 and the reception timing correction unit 1121 check whether the latest reception path timing $t_{f1}$ of the first frequency band $f_1$ and the latest reception path timing $t_{f2}$ of the second frequency band $f_2$ exist (Step S114).

The correlation judgment threshold unit 1132 sets the correlation judgment threshold $thr_{f1\_f2}$ (Step S115).

The correlation judgment unit 1131 calculates the correlation judgment value $c_{f1\_f2}$ (Step S116).

The correlation judgment unit 1131 compares the correlation judgment threshold $thr_{f1\_f2}$ with the correlation judgment value $c_{f1\_f2}$, and judges the similarities between the path timing of the first frequency band $f_1$ and the path timing of the second frequency band $f_2$ (Step S117).

When "$c_{f1\_f2} \leq thr_{f1\_f2}$" (Step S117: Yes), the correlation judgment unit 1131 judges that the path timing of the first frequency band $f_1$ and that of the second frequency band $f_2$ are similar to each other, and then the process proceeds to Step S118.

On the other hand, when "$c_{f1\_f2} > thr_{f1\_f2}$" (Step S117: No), the correlation judgment unit 1131 judges that the path timing of the first frequency band $f_1$ and that of the second frequency band $f_2$ are not similar to each other, determines "the path timing of the first frequency band $f_1 = t_{f1}$", and ends the processing (Step S122).

The reception timing correction unit 1121 compares the path timing $t_{f1}$ of the first frequency band $f_1$ with the path timing $t_{f2}$ of the second frequency band $f_2$ to determine whether they are equal to each other (Step S118).

When the reception timing correction unit 1121 determines that "$t_{f1} \neq t_{f2}$" (Step S118: No), the process proceeds to Step S119.

On the other hand, when the reception timing correction unit 1121 determines that "$t_{f1} = t_{f2}$" (Step S118: Yes), the reception timing correction unit 1121 determines "the path timing of the first frequency band $f_{f1} = t_{f1}$" and ends the processing (Step S122).

The path update threshold unit 1122 sets the path update threshold $thr_{udt}$ that is used to update the path timing $t_{f1}$ of the first frequency band $f_1$ (Step S119).

The reception timing correction unit 1121 compares the difference between the path timing $t_{f1}$ of the first frequency band $f_1$ and the path timing $t_{f2}$ of the second frequency band $f_2$ with the path update threshold $thr_{udt}$ (Step S120).

When "$t_{f1} - t_{f2} > thr_{udt}$" (Step S120: No), the reception timing correction unit 1121 determines that it is required to update the path timing $t_{f1}$ of the first frequency band $f_1$, determines "the path timing of the first frequency band $f_1 = t_{f2}$", and ends the processing (Step S121).

On the other hand, in the case of "$t_{f1} - t_{f2} \leq thr_{udt}$" (Step S120: Yes), the reception timing correction unit 1121 determines that there is no need to update the path timing $t_{f1}$ of the first frequency band $f_1$, determines "the path timing of the first frequency band $f_1 = t_{f1}$", and ends the processing (Step S122).

The reception timing correction unit 1121 judges whether only the path timing $t_{f2}$ of the second frequency band $f_2$ exists (Step S123).

When only the path timing $t_{f2}$ of the second frequency band $f_2$ exists (Step S123: Yes), the reception timing correction unit 1121 determines "the path timing of the first frequency band $f_1 = t_{f2}$" and ends the processing (Step S126).

When only the path timing $t_{f1}$ of the first frequency band $f_1$ exits (Step S123: No), the reception timing correction unit 1121 determines "the path timing of the second frequency band $f_2 = t_{f1}$" (Step S124). Further, the reception timing correction unit 1121 determines the "the path timing of the first frequency band $f_1 = t_{f1}$" and ends the processing (Step S125).

The judgment unit 113 of the target UE/BS judges similarities between the path timing of the first frequency band $f_1$ and the path timing of the second frequency band $f_2$. Further, the determination unit 112 of the target UE/BS corrects the path timing of the first frequency band $f_1$ using the path timing information of the first frequency band $f_1$ and the second frequency band $f_2$.

The target UE/BS is able to reduce the inter-symbol interference (ISI) between OFDM symbols by appropriately correcting the path timing of the first frequency band $f_1$. As a result, according to this example embodiment, it is possible to provide the radio communication apparatus, the radio communication system, the radio communication method, and the program capable of demodulating signals at appropriate reception timings.

Further, it is possible that, in Carrier Aggregation (CA), Dual Connectivity (DC), or BWP switching, the state of the radio propagation path may be poor, or noise may be so strong that it becomes difficult to detect a path (detect a delay profile) and it may become impossible to detect the reception timing in the first frequency band $f_1$. In this case as well, the target UE/BS uses the reception timing of the second frequency band $f_2$ in place of the first frequency band $f_1$, whereby it is possible to demodulate the signal at an appropriate path timing.

Accordingly, the target UE/BS is able to provide an appropriate reception timing even in a case in which the path cannot be detected in a desired frequency band and the path timing cannot be detected in CA, DC, or BWP switching.

Further, when the influence of Blocking becomes prominent depending on the level of the frequency band, it is possible that the fluctuation of the path timing may become large and the communication quality may not be kept constant. In this case as well, the target UE/BS uses a reception timing of another frequency band in place of that of the frequency band where it is difficult to detect the path timing, whereby it is possible to demodulate the signal at an appropriate path timing.

Comparative Example

Figure 9:
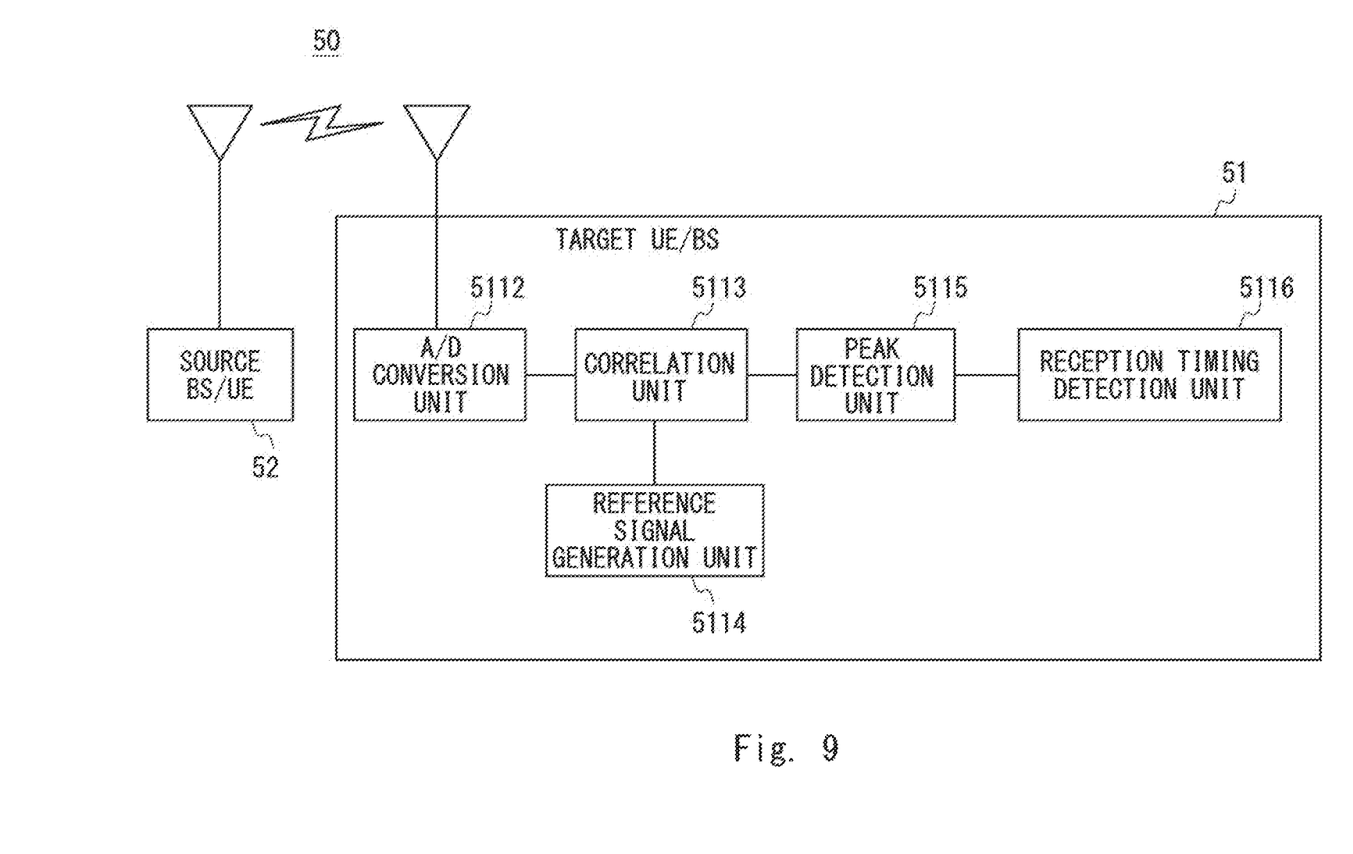
FIG. 9 is a block diagram illustrating a radio communication system according to a comparative example of the example embodiment.

FIG. 9 is a block diagram illustrating a radio communication system according to a comparative example of the example embodiment.

As shown in FIG. 9, a radio communication system 50 according to the comparative example of the example embodiment is different from the radio communication system 10 according to the example embodiment in that some of the components of the measurement unit 111 (the frequency separation unit 1111, the A/D conversion unit for the second frequency band etc.), the determination unit 112, and the judgment unit 113 are not provided.

The source BS/UE (the other radio communication apparatus 52) transmits a reference signal that is necessary to detect the reception path in the reception processing in the target UE/BS (radio communication apparatus 51) in the first frequency band $f_1$.

The A/D conversion unit 5112 receives the reference signal transmitted from the source BS/UE as a reception reference signal affected by the radio propagation path or noise. The A/D conversion unit 5112 A/D converts the reception reference signal to generate a digital reception reference signal, and outputs this generated signal to the correlation unit 5113.

The reference signal generation unit 5114 generates, based on the information regarding the reference signal regarding which a notification has been sent in advance, a reference signal, and outputs the generated signal to the correlation unit 5113.

The correlation unit 5113 calculates a correlation value using the digital reception reference signal and the reference signal and outputs the calculated correlation value to the peak detection unit 5115.

The peak detection unit 5115 detects, from the correlation value, the maximum correlation value cm and the corresponding instantaneous path timing $t_{inst}$ as shown in FIG. 3. The peak detection unit 5115 outputs the maximum correlation value $c_{max}$ and the instantaneous path timing $t_{inst}$ to the reception timing detection unit 5116.

The reception timing detection unit 5116 stores the maximum correlation value $c_{max}$ and the instantaneous path timing $t_{inst}$ in a memory (not shown). The reception timing detection unit 5116 weights the past and latest maximum correlation value $c_{max}$ and instantaneous path timing $t_{inst}$ stored in the memory and determines the path timing.

As shown in FIG. 5, in the radio communication apparatus 51, when the path timing $t_{f1}$ of the first frequency band $f_1$ is late due to the state of the radio propagation path, time at which the OFDM symbol is extracted is delayed, and inter-symbol interference occurs between this OFDM symbol and the adjacent OFDM symbol.

Accordingly, according to the comparative example, it is difficult to provide a radio communication apparatus, a radio communication system, a radio communication method, and a program capable of demodulating signals at appropriate reception timings.

While the present disclosure has been described as a hardware configuration in the above example embodiment, the present disclosure is not limited thereto. The present disclosure can achieve processing of the respective components by causing a Central Processing Unit (CPU) to execute a computer program.

In the aforementioned example embodiment, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described with reference to the example embodiment, the present disclosure is not limited to the aforementioned example embodiment. Various changes that can be understood by those skilled in the art can be made to the configurations and the details of the present disclosure within the scope of the present disclosure.

Note that the present disclosure is not limited to the aforementioned example embodiment and may be changed as appropriate without departing from the spirit of the present disclosure.

Each of the above-described embodiments can be combined as desirable by one of ordinary skill in the art.

According to the present disclosure, it is possible to provide a radio communication apparatus, a radio communication system, a radio communication method, and a program capable of demodulating signals at appropriate reception timings.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

REFERENCE SIGNS LIST 10, 50 Radio communication system
11 Radio communication apparatus
111 Measurement unit
1111 Frequency separation unit
1112a First frequency band A/D conversion unit
1112b Second frequency band A/D conversion unit
1113a First frequency band correlation unit
1113b Second frequency band correlation unit
1114a First frequency band reference signal generation unit
1114b Second frequency band reference signal generation unit
1115a First frequency band peak detection unit
1115b Second frequency band peak detection unit
1116a First frequency band reception timing detection unit
1116b Second frequency band reception timing detection unit
112 Determination unit
1121 Reception timing correction unit
1122 Path update threshold unit
113 Judgment unit 1131 Correlation judgment unit
1132 Correlation judgment threshold unit
12, 52 Another radio communication apparatus
121 Transmission unit
5112 A/D conversion unit
5113 Correlation unit
5114 Reference signal generation unit
5115 Peak detection unit
5116 Reception timing detection unit
$c_{f1}$, $c_{f2}$ Correlation value
$c_{f1\_f2}$ Correlation judgment value
$c_{inst\_f1}$, $c_{inst\_f2}$ Instantaneous maximum correlation value
$c_{max}$ Maximum correlation value
$f_1$ First frequency band
$f_2$ Second frequency band
$t_{m1}$ First time
$t_{m2}$ Second time
$t_0$, $t_1$, $t_2$, $t_3$ Reception timing
$t_{f1}$, $t_{f2}$ Path timing
$t_{inst\_f1}$, $t_{inst\_f2}$ Instantaneous path timing
$t_{inst}$ Instantaneous path timing
$thr_{f1\_f2}$ Correlation judgment threshold
$thr_{udt}$ Path update threshold
$N_{corr}$ Number of samples

What is claimed is:

1. A radio communication apparatus comprising:
a processor; and
memory storing executable instructions that, when executed by the processor, causes the processor to:
measure delay profiles of a plurality of frequency bands; and
determine a path timing of a first frequency band based on a time difference between a first time indicating a time of a maximum amplitude in the first frequency band of the plurality of frequency bands and a second time indicating a time of a maximum amplitude in a second frequency band of the plurality of frequency bands,
wherein when the first time is later than the second time and the time difference is larger than a path update threshold, the second time is determined to be the path timing of the first frequency band, and
wherein when the first time is later than the second time and the time difference is equal to or smaller than the path update threshold, the first time is determined to be the path timing of the first frequency band.

2. The radio communication apparatus according to claim 1, wherein when the maximum amplitude at the first time is equal to or smaller than a predetermined amplitude, the second time is determined to be the path timing of the first frequency band.

3. A radio communication apparatus comprising:
a processor; and
memory storing executable instructions that, when executed by the processor, causes the processor to:
measure delay profiles of a plurality of frequency bands;
determine a path timing of a first frequency band based on a time difference between a first time indicating a time of a maximum amplitude in the first frequency band of the plurality of frequency bands and a second time indicating a time of a maximum amplitude in a second frequency band of the plurality of frequency bands; and
judge similarities between the path timing of the first frequency band and a path timing of the second frequency band,
wherein the path timing of the first frequency band is determined based on the time difference and the similarities, and
wherein when the first time is later than the second time, the time difference is larger than a path update threshold, and there are similarities between the path timing of the first frequency band and the path timing of the second frequency band, the second time is determined to be the path timing of the first frequency band.

4. A radio communication apparatus comprising:
a processor; and
memory storing executable instructions that, when executed by the processor, causes the processor to:
measure delay profiles of a plurality of frequency bands; and
determine a path timing of a first frequency band based on a time difference between a first time indicating a time of a maximum amplitude in the first frequency band of the plurality of frequency bands and a second time indicating a time of a maximum amplitude in a second frequency band of the plurality of frequency bands; and
judge similarities between the path timing of the first frequency band and a path timing of the second frequency band,
wherein when the first time is later than the second time and the time difference is larger than a path update threshold, the second time is determined to be the path timing of the first frequency band, and
wherein when the first time is later than the second time and the time difference is equal to or smaller than the path update threshold, the first time is determined to be the path timing of the first frequency band, and
wherein the similarities are judged based on a correlation judgment value, which is a difference between a correlation value of the first frequency band and a correlation value of the second frequency band.

5. The radio communication apparatus according to claim 4, wherein
similarities between the path timing of the first frequency band and the path timing of the second frequency band are judged when the correlation judgment value is equal to or smaller than a correlation judgment threshold, and
no similarities between the path timing of the first frequency band and the path timing of the second frequency band are judged when the correlation judgment value is larger than the correlation judgment threshold.

* * * * *